July 9, 1968          F. LAURENT          3,391,973
VARIABLE FOCUS OBJECTIVE LENS Filed April 25, 1967                          2 Sheets-Sheet 1

INVENTOR

FRANCOIS LAURENT

BY

ATTORNEY

INVENTOR
FRANCOIS LAURENT
BY
ATTORNEY

United States Patent Office 3,391,973
Patented July 9, 1968

3,391,973
VARIABLE FOCUS OBJECTIVE LENS
Francois Laurent, Yverdon, Vaud, Switzerland, assignor to Paillard S.A., Vaud, Switzerland, a corporation of Switzerland
Continuation-in-part of application Ser. No. 322,339, Nov. 8, 1963. This application Apr. 25, 1967, Ser. No. 633,516
Claims priority, application Switzerland, Nov. 15, 1962, 13,370/62
1 Claim. (Cl. 350—176)

ABSTRACT OF THE DISCLOSURE

A variable focus objective lens of the type having mechanical compensation and by means of which it is possible to accomplish a focusing on an object very close thereto, for example, an object situated at a distance of a few centimeters therefrom, without any adjustment operation of the focusing being accompanied by any modification in the exterior dimensions of the objective lens, having at least one fixed optical element disposed on the side towards the object, a second movable divergent optical element, or variator element, a third movable convergent optical element, or compensator element, and a fourth fixed convergent element. The variation of the focal length is obtained by the displacement of the movable convergent optical element, or compensator element, and the compensation of the back focus to stabilize the image is obtained by displacement of the movable divergent optical element, or variator element, the first fixed element presenting a focal length at least equal to the longest focal length of this objective lens, multiplied by $k$, $k$ being the ratio of the longest focal length of the objective lens divided by the shortest focal length, the focal length of the movable divergent optical element, or variator element, being at most equal to 0.24 $k$ multiplied by the longest focal length of the objective lens, focusing being obtained by displacement of said movable divergent optical element, or variator element. Said first fixed element can be convergent, divergent, or one having an infinite focal length.

---

This application is a continuation-in-part of Ser. No. 322,339, filed Nov. 8, 1963, now abandoned.

The present invention concerns a variable focus objective lens of the type having mechanical compensation and which comprises at least one fixed optical element, a first movable optical element as a variator and a second movable optical element as a compensator. The displacements of the first movable optical element with respect to the fixed element permit the variation in magnification of the objective lens, this variation causing a modification of the back focus of the objective lens, i.e. of the length between the rear lens and the focal plane. The displacement of the second movable optical element permits variation in the back focus of the objective lens without sensibly modifying its magnification, so that by a judicious choice of simultaneous displacements of the first and second movable optical elements there can be obtained a modification in the magnification of the objective lens without modifying the back focus thereof.

In known objective lenses of this type the adjustment of the focusing is effected by varying the position of the front fixed element of the objective lens, which element remains stationary during the variations of the focal length. This frontal element presents a relatively long focal length, so that it must effect a substantial displacement to permit the required focusing between infinity and the shortest focusing distance. Therefore, there must be selected a compromise to avoid a too large variation in the exterior dimension of the objective lens during the variation of its focal length. For this reason, the shortest focal length is in general chosen around 1 m.

The object of the present invention is to provide an objective lens in which it is possible to effect a focusing on a very close object, for example, situated at a distance of a few cm., without the adjustment operation of the focusing being accompanied by a modification in the exterior dimensions of the objective lens.

According to the present invention, a variable focus objective lens consists of a first fixed element disposed on the side towards the object, a second movable divergent element, a third movable convergent element and a fourth fixed convergent element, in which the variation of the focal length is obtained by displacement of the movable convergent element, the compensation of the back focus to stabilize the image being obtained by displacement of the movable divergent element, characterized in that the first fixed element presents a focal length at least equal to the longest focal length of the objective lens, multiplied by $k$, $k$ being the ratio of the longest focal length of the objective lens divided by the shortest focal length, the focal length of the movable divergent element being at most equal to 0.24 $k$ multiplied by the longest focal length of the objective lens, focusing being obtained by the displacement of the said movable divergent element.

The invention will now be described further, by way of example, with reference to the accompanying drawings, in which.

Figure 4:
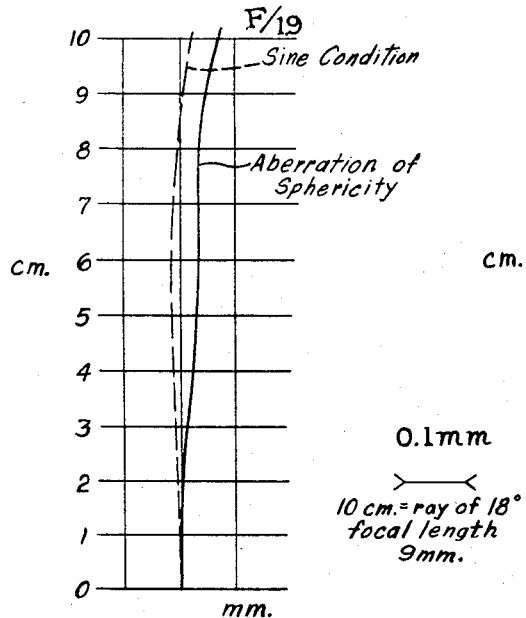
FIGURE 4 shows in full line the aberration of sphericity and in dotted line the sine condition.
Figure 5:
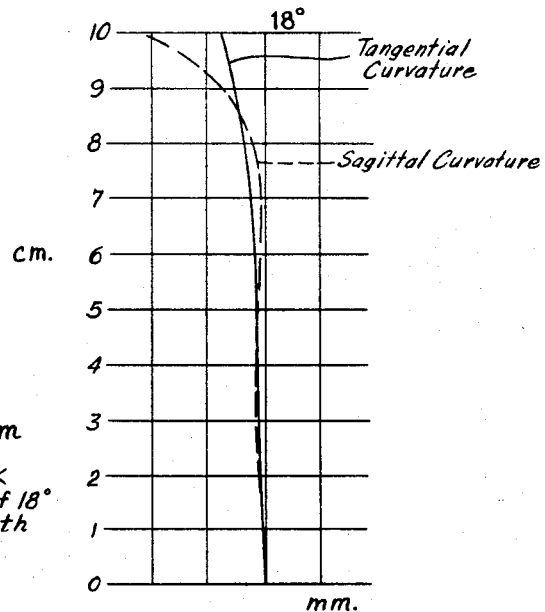
FIGURE 5 shows the astigmatism. The solid line indicates the tangential curvature, and the dotted line shows the sagittal curvature.

FIGURES 4 and 5 refer to the objective when it is set for the short focal length of 9 mm.

The horizontal scale is: 1 cm. of the drawing corresponds to 0.1 mm.

The vertical scale is: 10 cm. for an angle of the ray of 18 degrees.

Figure 6:
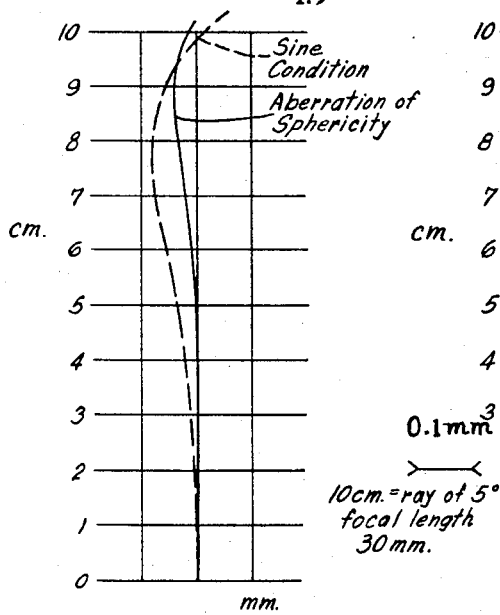
Figure 7:
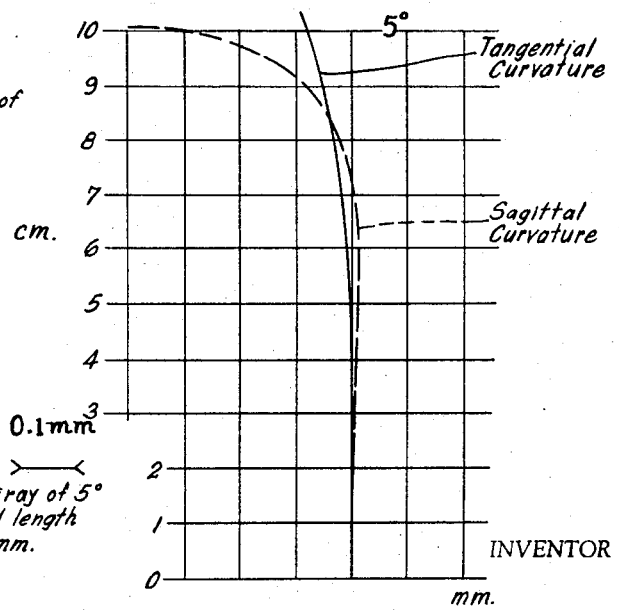

FIGURES 6 and 7 correspond to FIGURES 4 and 5 when the objective is set on the long focal length of 30 mm., wherein the vertical scale is: 10 cm. for 5 degrees.

The objective lens shown comprises a first fixed frontal element 1, a second divergent and movable element 2, a third convergent and movable element 3, and a convergent fixed element 4. Each of these elements has been shown as if it was constituted by a single lens, but it is quite evident that in practice at least one of these elements must be formed by an assembly of several lenses, in such a manner as to permit the correction of the usual aberrations of objective lenses.

The focal length of the divergent element 2 is at the most equal to 0.24 $k$ multiplied by the longest focal length of the objective lens. The factor $k$ represents the ratio of the longest to the shortest focal lengths of the objective lens. In other terms $k$ represents the number by which the shortest focal length must be multiplied to obtain the longest focal length.

In the example described, the focal length of the objective lens can vary from 9 mm. to 33.44 mm. so that $k$ equals 3.73. The focal length of the element 1 is at least equal to $k$ multiplied by the longest focal length of the objective lens. Thus, in the objective lens represented, the focal length of the element 1 must at least be equal to 124.73 mm., this element being able to be convergent or divergent. In the example shown, the element 1 is convergent and presents a focal length of 340.78 mm.

The focal length of the element 2 must be smaller than 0.24 $k$ multiplied by 33.44 which equals 29.94 mm. The length chosen in the present case is equal to 28.3682 mm.

The movable convergent element presents a focal length of 19.63 mm. and the fixed convergent element a focal length of 14 mm.

Figure 1:
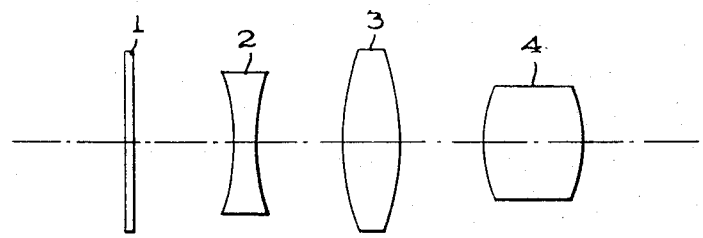
FIGURE 1 is an axial representation of the objective lens.
Figure 2:
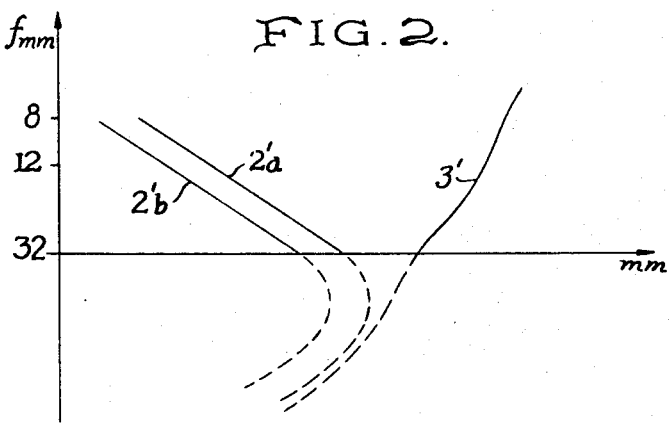
FIGURE 2 is a diagram showing the displacements of the variator and the compensator as a function of the focal length chosen for the objective lens.
Figure 3:
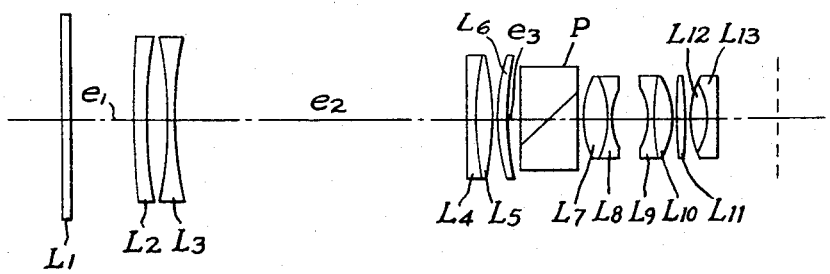
FIGURE 3 shows the detail of the objective lenses.

FIGURE 2 shows the position of the elements 2 and 3 as a function of the focal length of the objective lens.

In the objective lens shown, the focusing is effected by a displacement of the divergent element 2, and as the refractive power of this element is high, the displacements which must be effected to permit the focusing are very small.

In FIGURE 2, the curve $2'a$ shows the position which the element 2 must occupy as a function of the focal length when the focusing is adjusted on infinity, while the curve $2'b$ shows the position which the element 2 must occupy for a focusing on 10 cm., and the curve $3'$ shows the position which the element 3 must occupy with respect to the position occupied by the element 2.

Referring further to FIGURE 2, the axis of the abscissas is a linear graduation. In a calculated example, the curve $2'a$ intersects the axis of the abscissas on a division corresponding to 45 mm. The division corresponding to 0 mm. coincides with the axis of the ordinates.

Due to the above-mentioned choice of refractive power of the elements 1 and 2, it is possible to obtain a large variation of the ratio of the focal lengths without upturning of the displacement of the element 2. If this upturning is admitted, which is represented in broken lines in FIGURE 2, there can be obtained a very large total variation of the ratios of the focal lengths. Finally, the focusing of the objective lens can be extraordinarily close and it is possible to obtain a correct focusing without exaggerated deformation of the object, when this is found up to the immediate neighborhood of the element 1.

The following is a table of values for all parameters of an operable lens according to the disclosure:

|  | $d$, mm. | $R_1$ | $R_2$ | Glass types | $n$ | Spacing |
|---|---|---|---|---|---|---|
| $L_1$ | 2.5 | +306.4 | ∞ | SK 16 | 1.62041 | |
| $L_2$ | 2 | +126.7 | +57.08 | SK 16 | 1.62041 | $e_1$ 2.8 |
| $L_3$ | 1.5 | −189.6 | +33.6 | SK 16 | 1.62041 | |
| $L_4$ | 1.5 | +189.6 | +28.16 | D 3128 | 1.73150 | $e_2$ 0 |
| $L_5$ | 4.6 | +28.16 | −28.16 | SK 16 | 1.6241 | 0.1 |
| $L_6$ | 2.5 | +18.28 | +73.14 | LaK 9 | 1.69100 | |
| P | 7 | ∞ | ∞ | BK 7 | 1.52680 | $e_3$ 0.2 |
| $L_7$ | 3.0 | +8.6 | −13.97 | FK 6 | 1.44628 | 0 |
| $L_8$ | 0.5 | −13.97 | +6.72 | LaSF 2 | 1.83739 | 5.5 |
| $L_9$ | 0.6 | −7.11 | +20.66 | LaSF 2 | 1.83739 | 0 |
| $L_{10}$ | 2.5 | +20.66 | −6.9 | SFS 3 | 1.78470 | 0.1 |
| $L_{11}$ | 1.2 | +136.2 | −34 | LaK 17 | 1.78847 | 0.1 |
| $L_{12}$ | 2.6 | +19.28 | −4.87 | LaK 17 | 1.78847 | 0 |
| $L_{13}$ | 0.5 | −4.87 | +94.11 | SFS 3 | 1.78470 | |

Back focal length=10.9589

$d$=thickness of the lens.
$R_1$=Front radius of curvature.
$R_2$=Rear radius of curvature.
$n$=Index of refraction.

| Focal length, mm. | $e_1$ | $e_2$ | $e_3$ |
|---|---|---|---|
| 9 | 7.00 | 55.00 | 1.70 |
| 30.07 | 49.50 | 2.32 | 11.88 |

An important advantage of the objective lens is that its exterior dimensions are not modified during the adjustment of the focal length or of the focusing, as the distance between the fixed elements 1 and 4 remains constant.

I claim:
1. A variable focus objective lens consisting of a first fixed component disposed on the side towards the object, a second movable divergent variator component, a third movable convergent compensator component and a fourth fixed convergent component, in which the variation of the focal length is obtained by displacement of said movable convergent compensator component for the compensation of the back focus of this variable focus objective lens to stabilize the image being obtained by the displacement of the movable divergent variator component, the first fixed component presenting a focal length at least equal to the longest focal length of this objective lens, multiplied by $k$, $k$ being the ratio of the longest focal length of this objective lens divided by the shortest focal length, the focal length of the movable divergent variator component being at the most equal to 0.24 $k$ multiplied by the longest focal length of this objective lens, focusing being obtained by displacement of the said movable divergent variator component, whereby the exterior dimensions of said lens are not modified during the adjustment of the focal length and of the focusing, said objective lens having substantially the following values:

|  | $d$, mm. | $R_1$ | $R_2$ | Glass types | $n$ | Spacing |
|---|---|---|---|---|---|---|
| $L_1$ | 2.5 | +306.4 | ∞ | SK 16 | 1.62041 | |
| $L_2$ | 2 | +126.7 | +57.08 | SK 16 | 1.62041 | $e_1$ 2.8 |
| $L_3$ | 1.5 | −189.6 | +33.6 | SK 16 | 1.62041 | |
| $L_4$ | 1.5 | +189.6 | +28.16 | D 3128 | 1.73150 | $e_2$ 0 |
| $L_5$ | 4.6 | +28.16 | −28.16 | SK 16 | 1.6241 | 0.1 |
| $L_6$ | 2.5 | +18.28 | +73.14 | LaK 9 | 1.69100 | |
| P | 7 | ∞ | ∞ | BK 7 | 1.52680 | $e_3$ 0.2 |
| $L_7$ | 3.0 | +8.6 | −13.97 | FK 6 | 1.44628 | 0 |
| $L_8$ | 0.5 | −13.97 | +6.72 | LaSF 2 | 1.83739 | 5.5 |
| $L_9$ | 0.6 | −7.11 | +20.66 | LaSF 2 | 1.83739 | 0 |
| $L_{10}$ | 2.5 | +20.66 | −6.9 | SFS 3 | 1.78470 | 0.1 |
| $L_{11}$ | 1.2 | +136.2 | −34 | LaK 17 | 1.78847 | 0.1 |
| $L_{12}$ | 2.6 | +19.28 | −4.87 | LaK 17 | 1.78847 | 0 |
| $L_{13}$ | 0.5 | −4.87 | +94.11 | SFS 3 | 1.78470 | |

Back focal length=10.9589

$d$=thickness of the lens.
$R_1$=Front radius of curvature.
$R_2$=Rear radius of curvature.
$n$=Index of refraction.

wherein the variable spacings $e_1$, $e_2$ and $e_3$ have substantially the following values:

| Focal length, mm. | $e_1$ | $e_2$ | $e_3$ |
|---|---|---|---|
| 9 | 7.00 | 55.00 | 1.70 |
| 30.07 | 49.50 | 2.32 | 11.88 | wherein said first fixed component consists of lens $L_1$, said second component consists of lenses $L_2$ and $L_3$, said third component consists of lenses $L_4$, $L_5$ and $L_6$, P is a beam splitter with plain parallel sides, and said fourth component consists of lenses $L_7$, $L_8$, $L_9$, $L_{10}$, $L_{11}$, $L_{12}$, and $L_{13}$.

No references cited.

DAVID H. RUBIN, Primary Examiner.

JEWELL H. PEDERSEN, Examiner.

R. J. STERN, Assistant Examiner.